(12) United States Patent
Imamura et al.

(10) Patent No.: US 7,285,344 B2
(45) Date of Patent: Oct. 23, 2007

(54) FUEL CELL CONTROL SYSTEM

(75) Inventors: Tomonori Imamura, Kariya (JP); Akimasa Osaki, Susuno (JP); Toshiyuki Kawai, Toyohashi (JP); Hideshi Izuhara, Nishikamo-gun (JP)

(73) Assignee: Denso Corporation, Kariya (JP)

( * ) Notice: Subject to any disclaimer, the term of this patent is extended or adjusted under 35 U.S.C. 154(b) by 418 days.

(21) Appl. No.: 10/629,586

(22) Filed: Jul. 30, 2003

(65) Prior Publication Data

US 2004/0033399 A1   Feb. 19, 2004

(30) Foreign Application Priority Data

Jul. 30, 2002  (JP) .............................. 2003-221387
Jun. 10, 2003  (JP) .............................. 2003-165381

(51) Int. Cl.
*H01M 8/04* (2006.01)
(52) U.S. Cl. .......................................... 429/23; 429/24
(58) Field of Classification Search .................. 429/12, 429/23, 24; 700/286, 297, 298
See application file for complete search history.

(56) References Cited

U.S. PATENT DOCUMENTS

| 4,756,718 | A * | 7/1988 | Ueno et al. ................ 29/623.5 |
| 6,815,107 | B2 * | 11/2004 | Inai et al. ...................... 429/22 |
| 2002/0009623 | A1 * | 1/2002 | St-Pierre et al. .............. 429/13 |
| 2002/0091475 | A1 * | 7/2002 | Hashimoto et al. ........... 701/48 |

FOREIGN PATENT DOCUMENTS

| JP | A 6-243882 | 8/1994 |
| JP | A 9-245826 | 8/1997 |
| JP | A 2000-208161 | 7/2000 |
| JP | A 2002-164065 | 6/2002 |
| JP | 2003178789 A * | 6/2003 |

OTHER PUBLICATIONS

Yoshiba et al., "Numerical analysis of molten carbonate fuel cell stack peformance: diagnosis of internal conditions using cell voltage profiles", Journal of Power Sources 87 (2000), pp. 21-27.*
Bender et al. "Further refinements in the segmented cell approach to diagnosing performance in polymer electrolyte fuel cells", Journal of Power Sources 123 (2003), pp. 163-171.*

* cited by examiner

*Primary Examiner*—Gregg Cantelmo
(74) *Attorney, Agent, or Firm*—Oliff & Berridge, PLC (57) ABSTRACT

A plurality of individual fuel cells are connected in series with each other to construct the fuel cell. The fuel cell is diagnosed on the basis of an average output voltage Va of the individual cells, their standard deviation $\sigma$, individual output voltages, their variances $\sigma^2$ of vibration components and their voltage drop speed of their non-vibration components. For example, if Va is within a normal range and moreover at least one of the individual output voltages is not within a normal range, it is diagnosed that water blocks the fuel electrode. If Va is not within a normal range and moreover $\sigma$ is within a normal range, it is diagnosed that the electrolyte film is dried. Further, if Va is not within a normal range and moreover $\sigma$ is not within a normal range, it is diagnosed that the fuel (hydrogen) supply is insufficient.

19 Claims, 9 Drawing Sheets

FUEL CELL CONTROL SYSTEM

BACKGROUND OF THE INVENTION

1. Field of the Invention

The present invention relates to a system for controlling a fuel cell which generates an electric power by an electrochemical reaction of hydrogen and oxygen and is applied to a family use generator, portable generator and mobile generators for an automobile and ship.

2. Description of the Related Art

The output of the fuel cell is lowered by a supply shortage of hydrogen and/or oxygen, by a blockade of a fuel (hydrogen) line and/or air (oxygen) line due to water flooding, or by a lowering of electrical conductivity of an electrolyte film due to its drying. Further, the fuel cell is degraded and its reliability is lowered, if it is operated under the above mentioned bad conditions.

Although its reliability is improved due to margins of operational conditions its operational efficiency is lowered by excessive supply of hydrogen and oxygen or water.

Therefore, in JP2000-208161A, such a parameter as fuel gas supply is controlled in order to hold a standard deviation of the fuel cell output voltage within a prescribed range.

However, the fuel cell as disclosed in JP2000-208161A has a disadvantage that factors causing the output deviation are not clearly decided. Accordingly, irrelevant factors are unnecessarily controlled, thereby lowering the operational efficiency of the fuel cell system.

Further, in JP2002-164065A, a cooling water flow direction is switched, thereby forming a prescribed humidity distribution along the built-up direction of individual cells and diagnosing the humidity condition of the fuel cell on the basis of the output voltages of the individual cells. Here, it is assumed that the relative humidity is the highest at the cooling water entrance, while it is the lowest at the exit, because the cooling water temperature is the lowest at the entrance, while it is the highest at the exit.

However, the cell temperature is in general higher at an intermediate portion of the cell than at the cooling water exit. This is because heat is radiated through cell container, while heat radiation is not easily caused at the intermediate portion. Further, the temperature distribution in the fuel cell is diversified by various conditions such as a cooling water temperature, ambient temperature and generated electric power.

Therefore, the fuel cell as disclosed in JP2002-164065A has a disadvantage that the inside humidity is not precisely determined, because the cooling water temperature does not always become highest at the cooling water exit.

SUMMARY OF THE INVENTION

An object of the present invention is to precisely estimate factors causing the output voltage changes of a fuel cell stack, regardless of the internal temperature distribution of a fuel cell.

The fuel cell operation as a whole is precisely diagnosed on the basis of the output voltages of every individual cell or a part of individual cells constructing the fuel cell stack.

It is a concrete object to precisely diagnose and suitably operate the fuel cell stack on the basis of an average output voltage Va of the individual cells, their standard deviation $\sigma$, their individual output voltages, their variance $\sigma^2$ of vibration components of the output voltages, their voltage drop speeds of their non-vibration components.

It is another concrete object to precisely diagnose and suitably operate the fuel cell stack, without introducing any uncertain and hypothetical temperature distribution in the fuel cell stack, but on the basis of the output voltages of the highest and lowest temperature cells.

The fuel cell control system of the present invention comprises: a fuel cell stack for generating an electric power by utilizing an electrochemical reaction of hydrogen and oxygen. The fuel cell stack supplies an electric load or a not-shown secondary battery with an electric power. For example, an electric motor for driving the electric vehicle corresponds to the load. The individual cell is, e.g., a solid polymer electrolyte fuel cell. The output voltage and temperature of each individual cell, or a part of them is measured by a cell monitor.

Further, the measurement result is inputted into an electronic control unit (ECU) for controlling fuel (hydrogen) pump & valve, air (oxygen) pump & valve, humidifier for electrolytes and electric load such as a motor.

According to the present invention, the fuel cell stack is reasonably and efficiently controlled by diagnosis means (ECU) on the basis of the output voltages and temperatures of individual fuel cells and their actual and statistical changes.

BRIEF EXPLANATION OF THE DRAWINGS

FIG. 2 is a flow chart, in accordance with Embodiment 1 of the present invention, of the electronic control unit (ECU) operation for diagnosing the fuel cell on the basis of an average output and so on.

PREFERRED EMBODIMENT OF THE INVENTION

Preferred embodiments of the present invention are explained, referring to the drawings.

Embodiment 1

Figure 1:
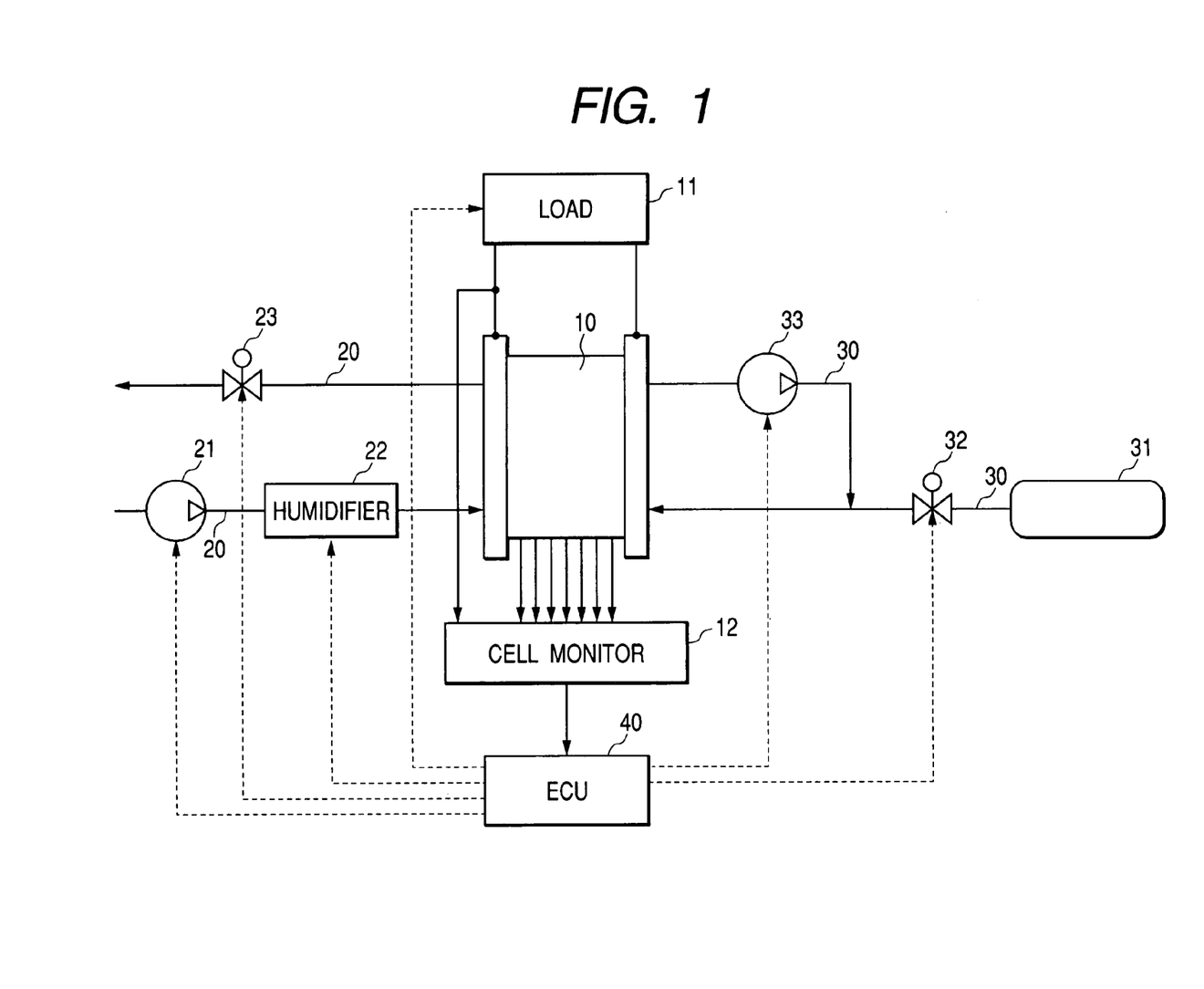
FIG. 1 is a block diagram of the fuel cell control system of the present invention for, e.g., an electric vehicle.

FIG. 1 is a block diagram of the fuel cell control system for, e.g., an electric vehicle.

As shown in FIG. 1, the fuel cell control system of the present invention comprises: a fuel cell stack (FC) 10 for not generating an electric power by utilizing an electrochemical reaction of hydrogen and oxygen. The FC 10 supplies an electric load 11 or a not-shown secondary battery with an electric power. For example, an electric motor for driving the electric vehicle corresponds to the load 11.

The individual fuel cells are, e.g., solid polymer electrolyte fuel cells. They are piled up and are electrically connected in series with each other. The following electrochemical reaction is caused in the FC 10.

(cathode) $H_2 \rightarrow 2H^+ + 2e^-$ (anode) $2H^+ + 1/2O_2 + 2e^- \rightarrow H_2O$ Further, output voltages of the individual cells measured by a cell monitor 12 (voltage measuring means) is inputted into a control unit 40.

Further, the FC 10 is provided with an air line 20 for supplying the anode (air electrode) with air (oxygen: oxidizing gas) and is provided with a fuel line 30 for supplying the cathode (fuel electrode) with hydrogen.

The air line 20 is connected with an air pump 21 for pumping air from the outside atmosphere to the FC 10. Further, a humidifier 22 is provided between the air pump 21 and the FC 10. Further, an air valve 23 for adjusting a pressure of the supplied air at the downstream side of the FC 10.

The uppermost stream side of the fuel line 30 is provided with a hydrogen cylinder 31, while a hydrogen valve 32 for adjusting a hydrogen pressure is provide between the hydrogen cylinder 31 and the FC 10.

The fuel line 30 is a loop closed at the downstream of the hydrogen valve 32, thereby recovering and circulating the hydrogen inside the fuel line 30. Further, there is provided at the downstream of the FC 10 in the fuel line 30 a hydrogen pump 33.

Electronic control unit (ECU) 40 (diagnostic means) comprises: a micro-computer including CPU, ROM & RAM and its peripheral circuits. The ECU 40 receives the output voltages of the individual cells from the cell monitor 12 and outputs control signals to the air pump 21, humidifier 22, air valve 23 and hydrogen valve 33.

The electric power supplied to the load 11 is controlled in such a manner that air and hydrogen supplies are simultaneously controlled by changing rotations of the air pump 21 and hydrogen pump 33, respectively. Particularly, the air supply is set up so as not to cause any deviation go out from a prescribed range in the out put voltage of the FC 10.

Figure 2:
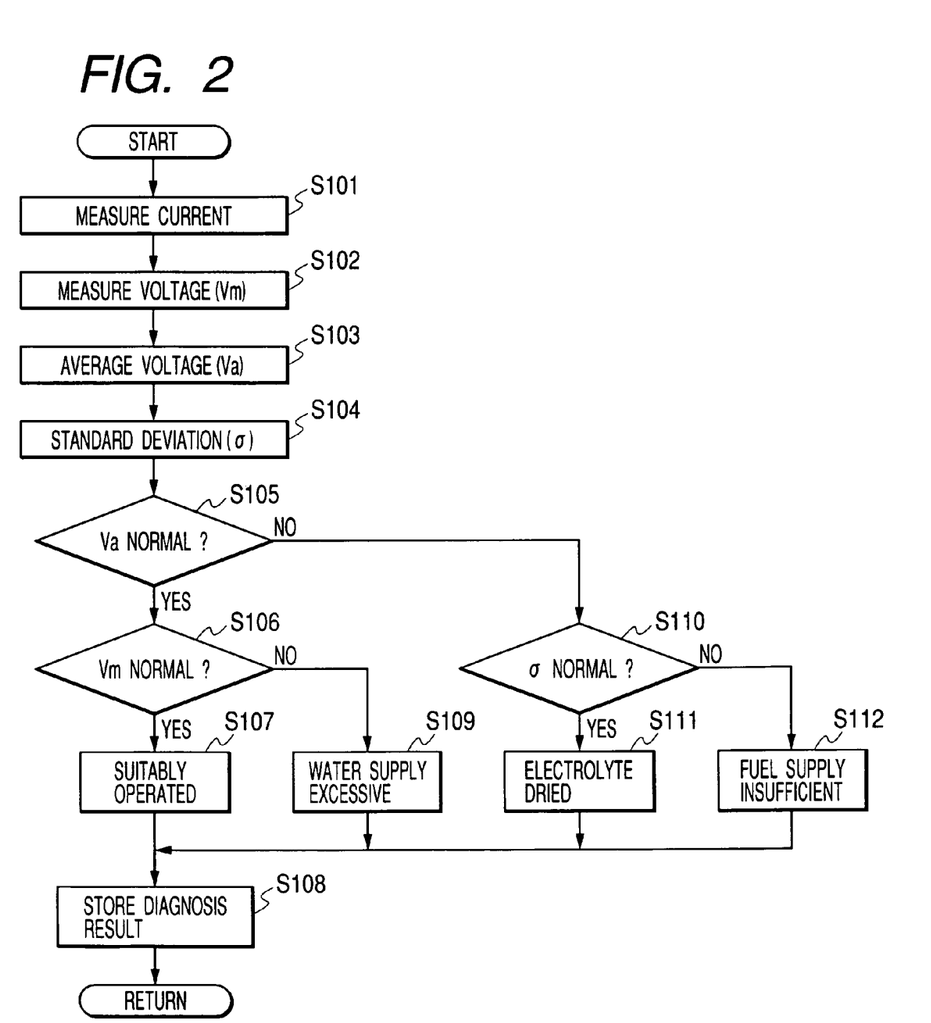

FIG. 2 is a flow chart of the operation of the ECU 40 for diagnosing the operation of the FC 10.

First, at S101, An electric current in the FC 10 is measured. Then, the following first and third ranges are decided on the basis of the measured electric current, where the first range is a range for determining whether the average cell voltage Va is within a normal range and the third range is a range for determining whether the standard deviation σ of the output voltages of the individual cells constructing the FC 10 is within a normal range.

Then, the individual output voltages are measured at S102; the average output voltage Va is calculated at S103 on the basis of the individual voltages measured at S102; and the standard deviation σ is calculated at S104 on the basis of the individual voltages measured at S102.

If Va is determined to be within the first range at S105 (YES), S106 follows.

At S106, the cell output voltage of each cell is compared with a second range defined by (Va-cσ), where "c" is a constant. If it is determined at S106 (YES) that there is not any voltage outside the second range among the measured voltages, then, S107 follows.

At S107, it is determined that the FC 10 is diagnosed to be suitably operated, because Va is normal and moreover the voltage deviation is small. Therefore, the diagnosis result is stored in S108.

Figure 3:
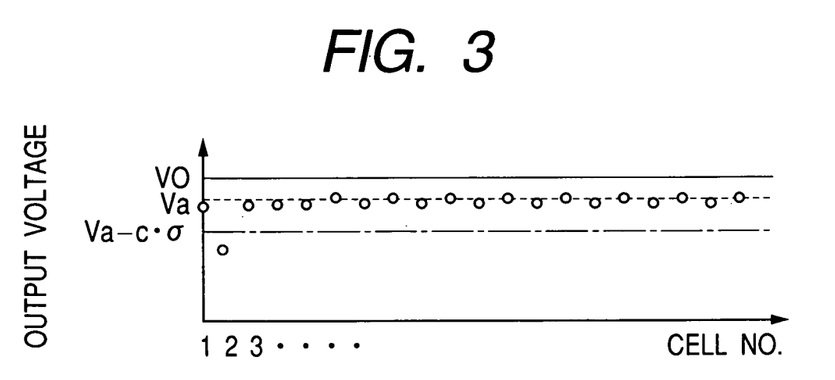
FIG. 3 is a graph showing such an FC state at S109 in accordance with Embodiment 1 that the average voltage Va is normal but an output voltage of an individual cell is out of a prescribed range (Va-c$\sigma$).

On the other hand, If the determination result is YES at S106, S109 follows. FIG. 3 shows an example of the output voltages of the individual cells at S109. V0 as shown by the solid line is an optimum average output voltage, when the electrolyte film is optimumly humidified. At S109, the FC 10 is being operated in such a manner that Va is normal and near V0, although the output voltage of a part of individual cells is not within the second range of (Va-cσ) and abnormally low, as exemplarily shown in FIG. 3.

In general, if the solid electrolyte film for conduction the hydrogen ion is sufficiently humidified, Va is not apt to be lowered. Further, if water blocks the fuel electrode of a certain cell, the hydrogen distribution is deviated, thereby causing a drastic output lowering of that certain cell. Therefore, at S109, it is diagnosed that the water in the fuel line 30 is excessively supplied. Then, the diagnosis result is stored at S108.

The excessive water supply is avoided by raising the hydrogen pressure by the hydrogen valve 32, thereby exhausting the water in the fuel line 30 through the solid electrolyte film to the air line 20.

Further, if the determination result is NO at S105, S110 follows wherein it is determined whether or not σ is within the third range. If σ is determined to be within the third range at S110 (YES), S111 follows.

Figure 4:
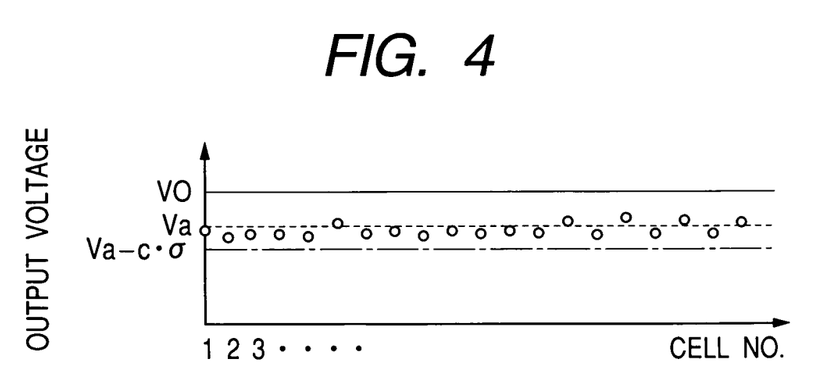
FIG. 4 is a graph showing such an FC state at S111 in accordance with Embodiment 1 that the average voltage Va is lowered from an optimum time average voltage V0 but the standard deviation $\sigma$ is within a normal range.

As shown in FIG. 4, Va is greatly lowered from V0 and is not within the first range, although σ is normal.

In general, the output voltages of the individual cells are not so much changed, if dry air is supplied. This is because the water is hardly condensed in the individual cells. However, Va is greatly lowered due to the drying in the solid electrolyte films of all the individual cells. Further, if dry air is supplied, water hardly blocks the fuel line 30 and therefore, the hydrogen distribution is not hardly deviated, thereby converging the hydrogen distribution deviation within a prescribed range. Therefore, it is diagnosed that the electrolyte film is dried. The diagnosis result is stored at S108.

The electrolyte drying is avoided by humidifying the air by the humidifier 22.

Further, If the determination result is NO at S110, S112 follows. In this case, both Va and σ are not abnormal.

In general, if the hydrogen supply is insufficient, Va is greatly lowered and σ itself is amplified due to the great deviation of the hydrogen distribution. Therefore, it is diagnosed that the hydrogen supply is in short. The diagnosis result is stored at S108.

The hydrogen supply shortage is avoided by increasing the hydrogen supply by raising the rotation number of the hydrogen pump 33.

According to Embodiment 1, the factors causing the output change of the FC 10 is precisely estimated on the basis of the average voltage, voltage deviation and output voltage.

Although in the above explanation the third range was decided on the basis of the operation electric current of the FC 10, it may be decided on the basis of a calculated by the individual output voltages.

Embodiment 2

Figure 5:
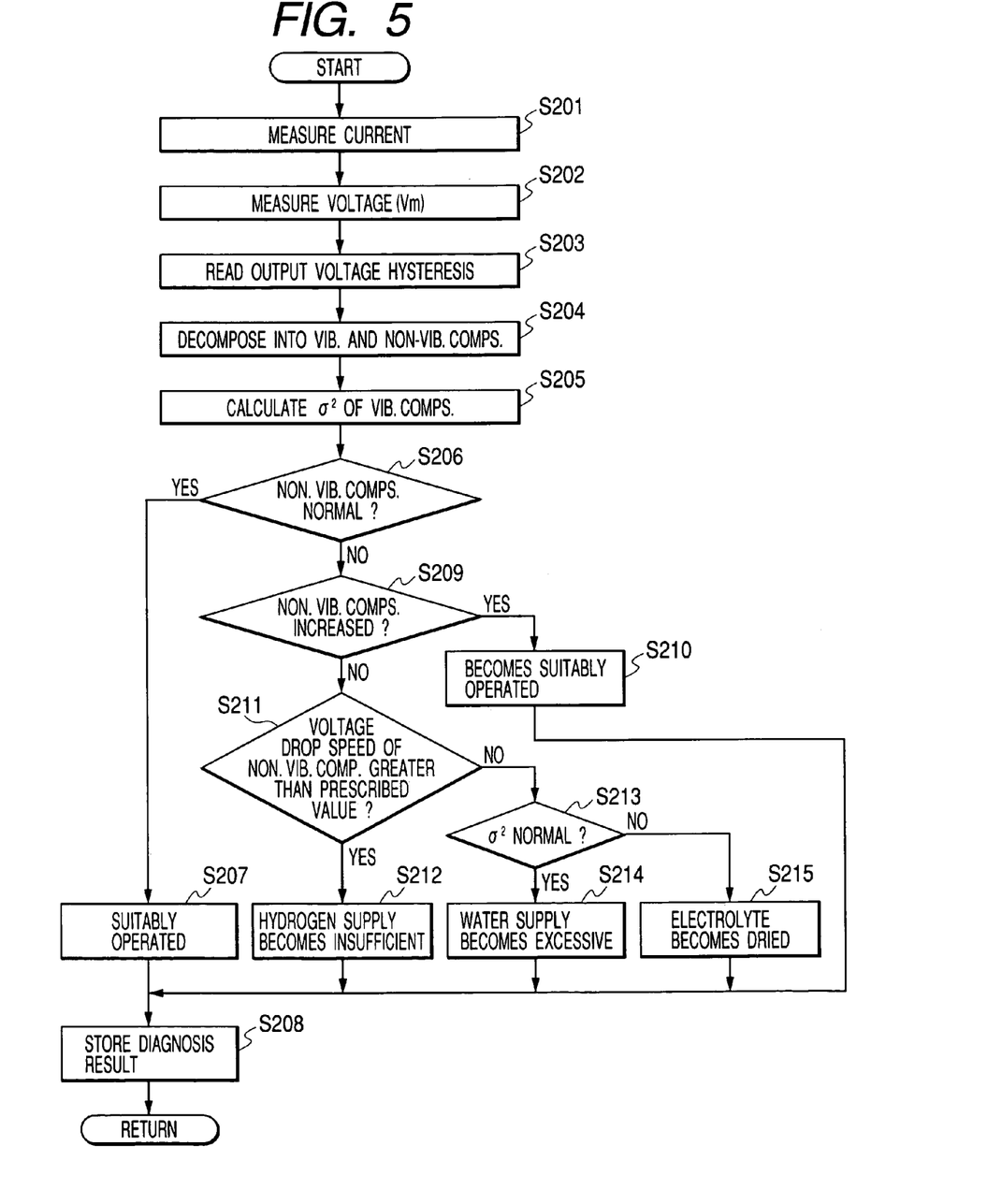
FIG. 5 is a flow chart for the ECU operation in accordance with Embodiment 2 for diagnosing the fuel cell stack (FC) on the basis of an output change with the passage of time.

FIG. 5 is a flow chart for the ECU 40 which diagnoses the FC 10 on the basis of an output change with the passage of time.

First, at S201, an electric current of The FC 10 is measured, and three values are decided: a fourth range; fifth range; and a prescribed output voltage drop speed of the non-vibration component of each individual cell, where the forth range is a range for determining whether a variance $\sigma^2$ of vibration components as explained later is within a normal range, the fifth range is a range for determining whether a non-vibration component as explained later is with in a normal range and the prescribed output voltage drop speed is a voltage for determining whether the voltage drop is within a normal range.

At S202, output voltages of the individual cells are measured. Then, at S203, a hysteresis or change in time of the voltage measured at S202 and stored in a memory in the ECU 40 is read out.

Figure 6:
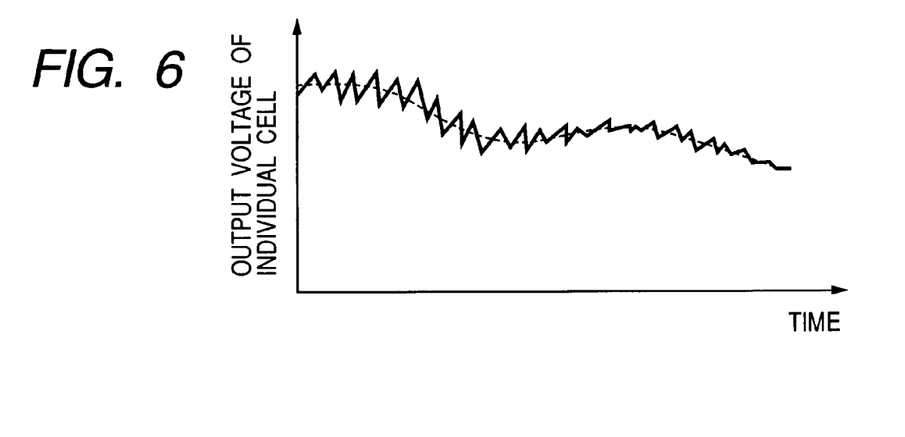
FIG. 6 is a graph of an exemplary output voltage change of a certain individual cell, where the slid line is an actual change, the vibration component is a voltage change gap between successive measurements and the non-vibration component is shown by a smoothes curve shown by the dotted line.

At S204, the output voltage hysteresis for each individual cell is separated into the vibration component and non-vibration component. FIG. 6 is a graph of an exemplary output voltage hysteresis of a certain individual cell, where the solid line is an actual hysteresis, the vibration component is a voltage gap between the successive measurements and the non-vibration component is shown by a smoothed curve shown by the dotted line.

At S205, a variance $\sigma^2$ of the vibration components is calculated. Then, if the non-vibration component is within the fifth range at S206 (YES), S207 follows.

At S207, it is diagnosed that the FC 10 is suitably operated, because the non-vibration component was determined to be within a normal range. The diagnoses result is stored at S208.

On the contrary, if the non-vibration component is not within the fifth range at S206 (NO), S209 follows, thereby determining whether the non-vibration component is ascending. If the non-vibration component is ascending at S209 (YES), then, S210 follows. At S210, it is diagnosed that the FC is suitably operated. The diagnosis result is stored at S208.

On the contrary, if the non-vibration component is not ascending at S209 (NO), S211 follows, thereby determining whether the voltage drop is within a normal range. If the voltage drop speed is greater than the prescribed value at S211 (YES), then, S212 follows. At S212, it is diagnosed that the hydrogen supply becomes insufficient. The diagnosis result is stored at S208.

On the contrary, if voltage drop speed is not greater than the prescribed value at S211 (NO), S213 follows, thereby determining whether the variance $\sigma^2$ of the vibration components is within the fourth range. If $\sigma^2$ is within the fourth range at S213 (YES), then, S214 follows.

When the non-vibration component falls slowly and more-over $\sigma^2$ is small, it means, in general, that the water in the FC 10 are being increased. This is because an effective reaction surface is decreased, as the water is increased, thereby gradually decreasing the output voltage from every individual cell. Therefore, at S214, it is diagnosed that the water supply becomes excessive. The diagnosis result is stored at S208.

On the contrary, if $\sigma^2$ is not within the fourth range at S213 (NO), S215 follows.

When the non-vibration component falls slowly and more-over $\sigma^2$ is great, it means, in general, that the solid electrolyte film is being dried. This is because the output voltage falls down gradually, as the solid electrolyte film is dried and the output change becomes great due to a water-absorption and dehydration to and from the electrolyte film. Therefore, it is diagnosed that the electrolyte film becomes dried. The diagnosis result is stored at S208.

According to Embodiment 2, the factors of the output change of the FC 10 is precisely estimated on the basis of the output voltage change in time.

Embodiment 3

The FC 10 is diagnosed on the basis of the output voltages of the highest and lowest temperature cells. The fuel cell control system is the same as that in Embodiment 1, except that the temperatures as well as the output voltages of the individual cells are inputted through the cell monitor 12 into the ECU 40.

Figure 7:
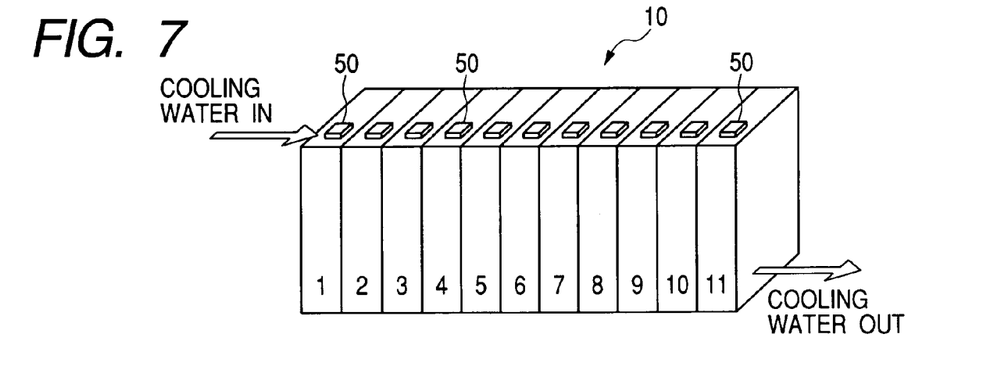
FIG. 7 shows an example of the FC built up by eleven individual cells in accordance with Embodiment 3, wherein, for example, the cooling water flows into the cell No. 1 and flows out from the cell No. 11 and temperature measuring means 50 is provided for all individual cells.

For example, as shown in FIG. 7, eleven individual cells 1 to 11 are built up in the fuel cell (FC) 10, wherein the cooling water flows into the individual cell 1 and flows out of the individual cell 11 and temperature measuring means (temperature sensors) 50 are provided for all individual cells.

The oxygen gas is supplied through the humidifier 22 to the FC 10. Accordingly, the absolute humidity of the oxygen gas is the same at the entrance of every individual cell. Nevertheless, the water supply becomes excessive due to a low temperature in the FC 10, while it becomes insufficient due to a high temperature in the FC 10. Thus, the operation of the FC 10 becomes changed due to its temperature. Reversely saying, it can be diagnosed whether the water supply is excessive or sufficient on the basis of statistically estimated or averaged relations between the individual output voltages and temperatures.

Figure 8:
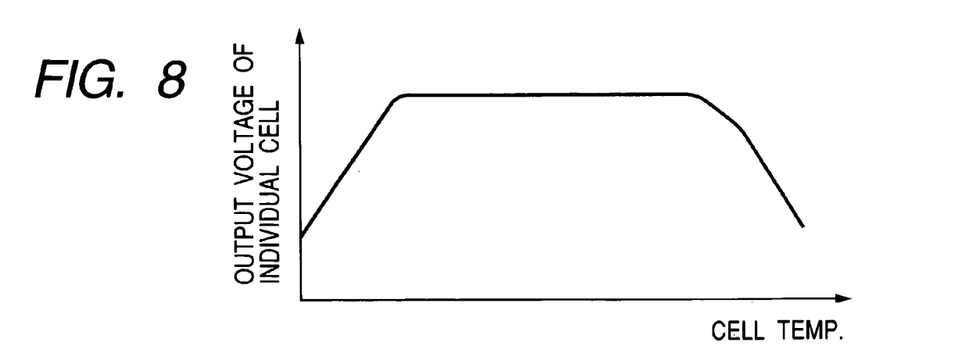
FIG. 8 is a graph showing a statistically estimated or averaged relation between the output voltage and temperature, when the absolute humidity at the individual cell is constant, in accordance with Embodiment 3.

FIG. 8 is a graph showing a relation between the output voltage and temperature, when the absolute humidity at the entrance of the individual cell is constant. As shown in FIG. 8, the output voltage is lowered, both when the temperature is lowered and the water in the gas becomes excessive, and when the temperature is raised and the water becomes insufficient. In other words, the water supply becomes excessive due to lowered output voltage and lowered temperature, while the water supply becomes insufficient due to the lowered output voltage and raised temperature.

Figure 9:
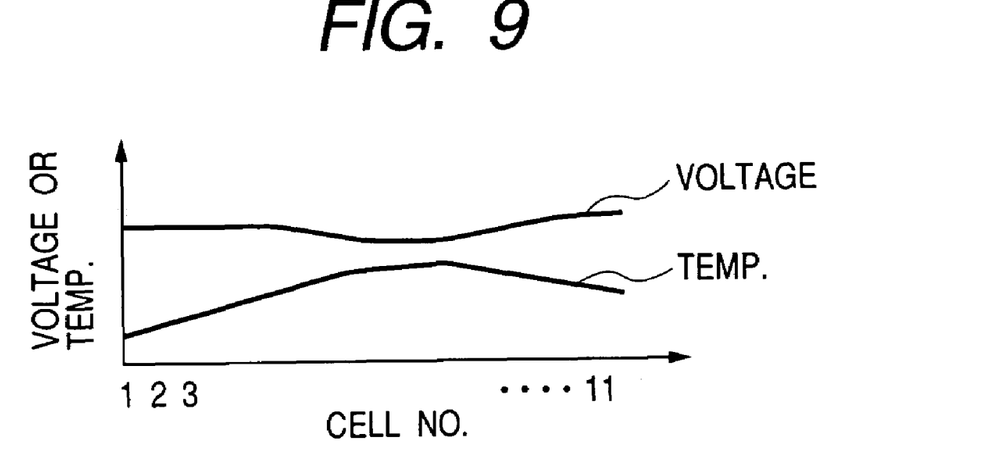
FIG. 9 is a graph showing a relation between the output voltages and temperatures of the individual cells, when the water supply is insufficient, in accordance with Embodiment 3.

Further, FIG. 9 is a graph of the output voltages and temperatures of the individual cells, when the water supply is insufficient. The individual cells which become hot and dried lower their output voltages.

Figure 10:
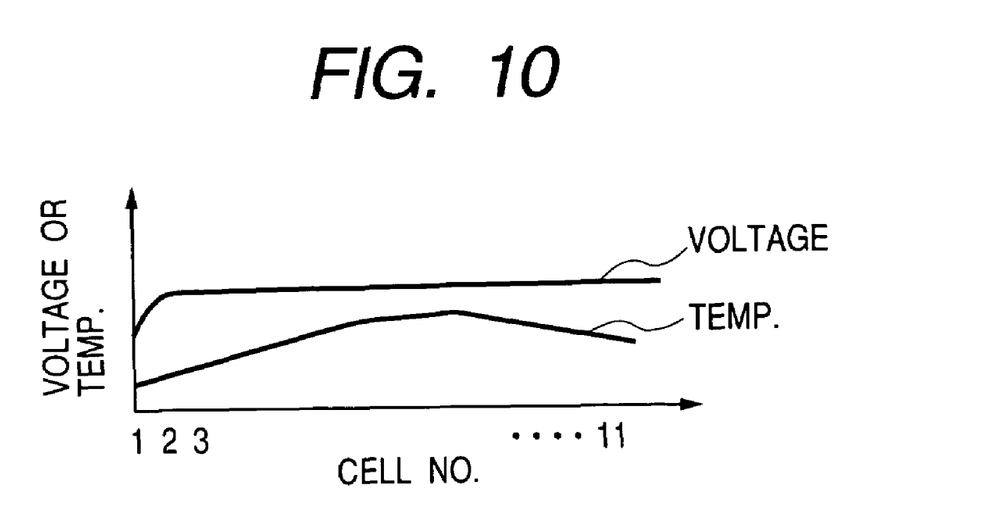
FIG. 10 is a graph showing a relation between the output voltages and temperatures of the individual cells, when the water supply is excessive, in accordance with Embodiment 3.

FIG. 10 is a graph of the output voltages and temperatures of the individual cells, when the water supply is excessive. A large quantity of water becomes condensed at the entrance of the low temperature cooling water, thereby lowering the output voltages near the entrance.

Figure 11:
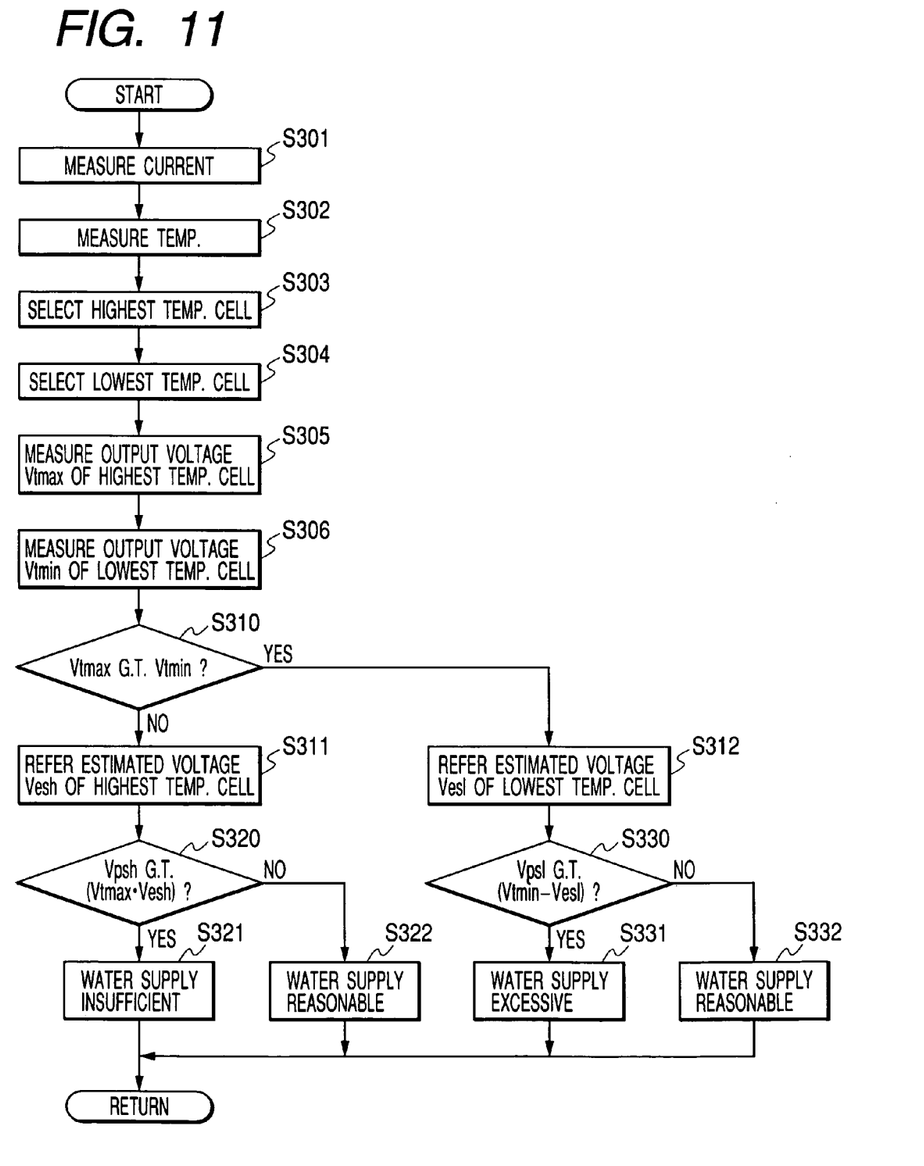
FIG. 11 is a flow chart of the ECU operation for diagnosing the FC on the basis of the output voltages Vtmax and Vtmin of the highest and lowest temperature cells, respectively, in accordance with Embodiment 3.

FIG. 11 is a flow chart of the operation of the ECU 40 for diagnosing the operation of the FC 10.

First, at S301, An electric current in the FC 10 is measured. Then, the temperatures of the individual cells are measured at S302; the highest temperature cell is selected at S303; and the lowest temperature cell is selected at S304.

Further, the high temperature cell voltage (output voltage Vtmax of the highest temperature cell) is measured at S305, and the low temperature cell voltage (output voltage Vtmin of the lowest temperature cell) is measured at S306.

If Vtmax is determined to be not greater than Vtmin at S310 (NO), an output voltage of the highest temperature cell at its optimum water supply is estimated to be Vesh at S311 on the basis of a characteristic map of statistically estimated or averaged temperature-current-voltage relations stored in the ECU 40.

If (Vtmax−Vesh) is determined to be smaller than a prescribed voltage Vpsh (negative value itself) at S320 (YES), Vtmax is lowered. Therefore, it is diagnosed at S321 that the electrolyte is dried due to an insufficient water supply. This is because the hot cells become dried and extremely lower their output voltages, as shown in FIG. 9. On the contrary, if (Vtmax−Vesh) is determined to be not smaller than a prescribed voltage Vpsh at S320 (NO), Vtmax is not lowered. Therefore, it is diagnosed at S322 that the water supply is reasonable.

Back to S310, if Vtmax is greater than Vtmin at S310 (YES), an output voltage of the lowest temperature cell at its optimum water supply is estimated to be Vesl at S312 on the basis of a characteristic map of statistically estimated or averaged temperature-current-voltage relations stored in the ECU 40.

If (Vtmin−Vesl) is determined to be smaller than a prescribed voltage Vpsl (negative value itself) at S330 (YES), Vtmin is lowered. Therefore, it is diagnosed at S331 that a large quantity of water is condensed at low temperature cells and their output voltages are lowered. On the contrary, if (Vtmax−Vesl) is determined to be not smaller than a prescribed voltage Vpsl at S330 (NO), Vtmax is not lowered. Therefore, it is diagnosed at S332 that the water supply is reasonable.

When the water supply is diagnosed to be insufficient, the water supply is increased by promoting the water supply to the electrolyte film by increasing the humidifying power of the humidifier 22 or increasing the air pressure or decreasing the hydrogen pressure. When the water supply is excessive, the humidifier 22 is switched off, the air pressure is decreased or the hydrogen pressure is increased.

According to Embodiment 3, the factors of the output change of the FC 10 is precisely estimated on the basis of the output voltages of the highest and lowest temperature cells.

Embodiment 4

Figure 12:
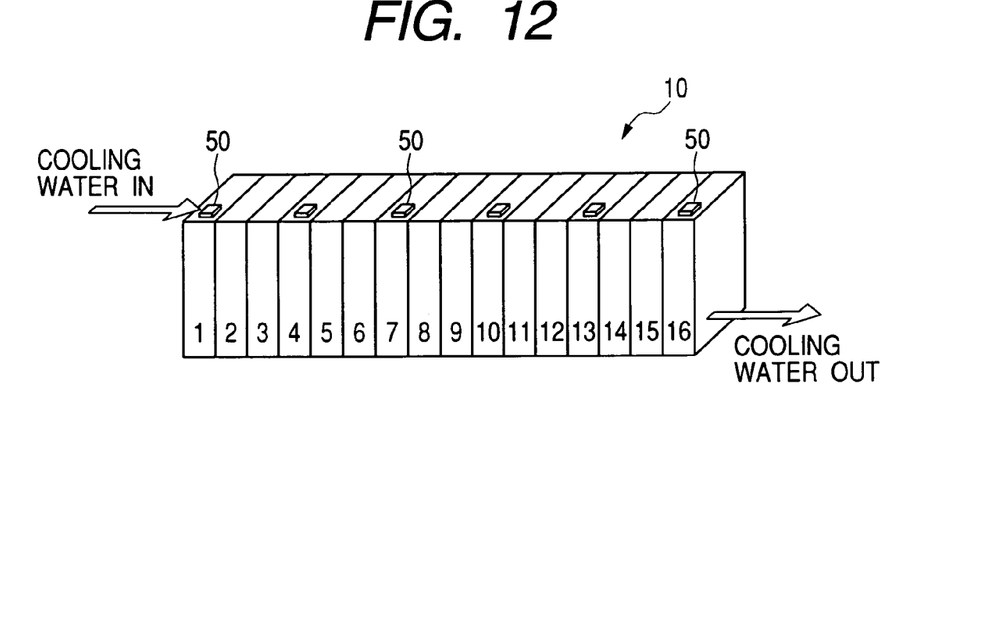
FIG. 12 shows an example of an arrangement of the temperature measuring means provided every three individual cells, in accordance with Embodiment 4.

FIG. 12 shows Embodiment 4. The fuel cell control system is the same as Embodiment 3, except that the temperature sensors 50 are provided, e.g., every three individual cells.

Figure 13:
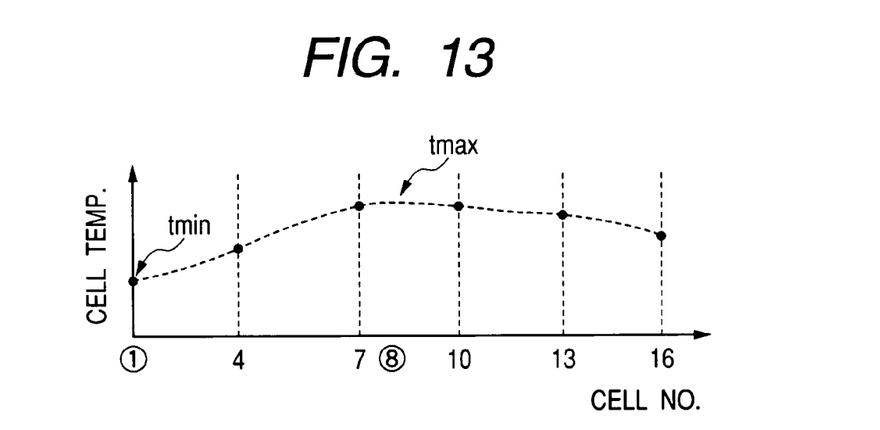
FIG. 13 shows an example of temperature interpolation for selecting the highest and lowest temperature cells, in accordance with Embodiment 4.

The temperature of the individual cells without the temperature sensor 50 are interpolated, thereby selecting the lowest temperature cell (cell 1) and highest temperature cell (cell 8), as exemplarily shown in FIG. 13.

The highest and lowest temperature cells may be selected among those with the temperature sensor 50.

Embodiment 5

The FC 10 is controlled on the basis of the highest temperature cell only, noticing that the water supply is apt to become insufficient for the highest temperature cell. Therefore, every individual cell is supplied with sufficient water, if the highest temperature cell is supplied with sufficient water. The fuel cell control system is the same as Embodiment 3.

Figure 14:
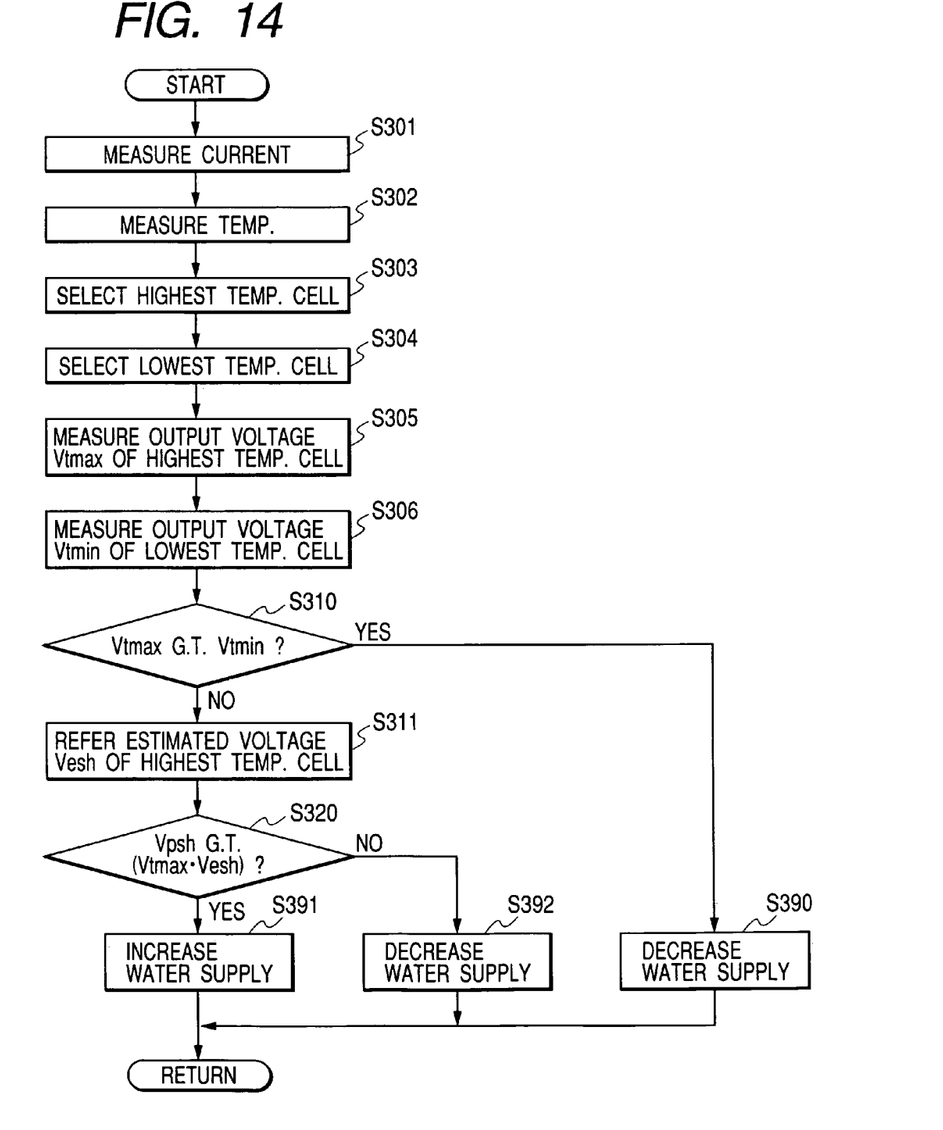
FIG. 14 is a flow chart of the ECU operation, in accordance with Embodiment 5, for diagnosing the FC on the basis of the highest temperature cell only, noticing that the water supply is apt to become insufficient for the highest temperature cell and that every individual cell is supplied with sufficient water, if the highest temperature cell is supplied with sufficient water.

FIG. 14 is a flow chart of the operation of the ECU 40 for diagnosing the operation of the FC 10.

After executing S301 to S306 (the same steps as shown in FIG. 11), Vtmax is compared with Vtmin at S310 (similarly to FIG. 11).

If Vtmax is determined to be greater than Vtmin at S310 (YES), the water supply is estimated to be reasonable or excessive. Therefore, the water supply is decreased at S390, because the individual cells do not instantly become dried, even if the water supply is decreased.

On the contrary, if Vtmax is not greater than Vtmin at S310 (NO), the output voltage of the highest temperature cell at its optimum water supply is estimated to be Vesh at S311 on the basis of a characteristic map of temperature, current and voltage stored in the ECU 40. Next, (Vtmax−Vesh) is compared with a prescribed voltage Vpsh (negative value itself) at S320.

If (Vtmax−Vesh) is smaller than Vpsh at S320 (YES), it is diagnosed that the highest temperature cell is dried and its output voltage is remarkably lowered. Therefore, the water supply for the FC 10 is increased at S391. On the other hand, if(Vtmax−Vesh) is not smaller than Vpsh at S320 (NO), the output voltage of the highest temperature cell is not lowered. Therefore, it is diagnosed that the water supply for the highest temperature cell is reasonable or excessive. Thus, the water supply for the FC 10 is decreased at S392.

The water supply is increased at S391 by promoting the water supply to the electrolyte film by increasing the humidifying power of the humidifier 22 or increasing the air pressure or decreasing the hydrogen pressure. On the other hand, the water supply is decreased at S390 and S392 by stopping the humidifier 22, decreasing the air pressure or increasing the hydrogen pressure.

MODIFIED EMBODIMENTS

The output voltage of each cell was detected by the cell monitor 12 in Embodiments 1 to 5. However, the output voltage may be detected every cell group of a plurality of cells.

Further, the hydrogen was circulated in the fuel line 30 in Embodiments 1 to 5. However, the fuel line may be completely opened or closed.

What is claimed is:

1. A fuel cell control system for controlling a fuel cell stack constructed by a plurality of individual cells each of which generates an electric power by an electrochemical reaction of hydrogen and oxygen, said fuel cell control system comprising:

output voltage measuring means for measuring output voltages of all or a part of said individual cells; and diagnosing means for diagnosing said fuel cell stack on the basis of the measured output voltages and their statistics, and for diagnosing at least whether or not an amount of water involved in said fuel cell stack is excessive based on said output voltage and an average voltage of said output voltages, wherein said operation of said fuel cell control system is controlled according to said diagnosis result of said diagnosing means, and wherein said fuel cell control system calculates the average voltage based on the output voltage of each individual cell measured by the output voltage measuring means and a standard deviation of the output voltages of said individual cells, and wherein said fuel cell control system causes the amount of water in said fuel cell stack to increase when the average voltage exceeds a predetermined voltage and the standard deviation is within a predetermined range, and causes the amount of hydrogen supplied to said fuel cell stack to increase when the average voltage exceeds the predetermined voltage and the standard deviation is out of the predetermined range.

2. The fuel cell control system according to claim 1, wherein said diagnosing means diagnoses that the hydrogen electrode is blocked by water, if said average voltage is within a prescribed range and at least one of said measured output voltages is not within a prescribed range.

3. The fuel cell control system according to claim 1, wherein said diagnosing means diagnoses that the electrolyte film is dried, if said average voltage is not within a prescribed range and said standard deviation is within a prescribed range.

4. The fuel cell control system according to claim 1, wherein said diagnosing means diagnoses that the hydrogen supply is insufficient, if said average voltage is not within a prescribed range and said standard deviation is not within a prescribed range.

5. The fuel cell control system according to claim 1, wherein said measured output voltages are traced in time.

6. The fuel cell according to claim 5, wherein each traced measured output voltage is decomposed into a vibrating component and non-vibrating component.

7. The fuel cell control system according to claim 6, wherein said diagnosing means diagnoses that the water supply becomes excessive, if said non-vibrating component becomes decreased and said vibrating component is within a prescribed range.

8. The fuel cell control system according to claim 6, wherein said diagnosing means diagnoses that the electrolyte film becomes dried, if said non-vibrating component becomes decreased and said vibrating component is not within a prescribed range.

9. The fuel cell control system according to claim 6, wherein said diagnosing means diagnoses that the hydrogen supply becomes insufficient, if said non-vibrating component becomes decreased and a speed drop of said non-vibrating component is greater than a prescribed speed.

10. The fuel cell control system according to claim 1, which further comprises temperature measuring means for measuring temperatures of all or a part of individual cells, wherein said diagnosing means diagnoses said fuel cell stack on the basis of statistically estimated output voltages (Vesh, Vesl) of the highest temperature individual cell and lowest temperature individual cell, respectively.

11. The fuel cell control system according to claim 10, wherein said diagnosing means diagnoses that the water supply is excessive, if the output voltage (Vtmin) of said lowest temperature individual cell is lower than the output voltage (Vtmax) of said highest temperature individual cell and (Vtmin) is smaller than (Vesl) defined when said water supply is reasonable.

12. The fuel cell control system according to claim 10, wherein said diagnosing means diagnoses that the water supply is insufficient, if the output voltage (Vtmax) of said highest temperature individual cell is lower than the output voltage (Vtmin) of said lowest temperature individual cell and moreover (Vtmax) is smaller than (Vesh) defined when said water supply is reasonable.

13. The fuel cell control system according to claim 10, wherein said highest and lowest temperature individual cells are selected among those which are provided with said temperature measuring means.

14. The fuel cell control system according to claim 10, wherein said highest and lowest temperature individual cells are selected by an interpolation on the basis of measured temperatures of said part of said individual cells.

15. The fuel cell control system according to claim 1, further comprising a fuel line joined between a hydrogen cylinder for storing hydrogen and said fuel cell stack, and a recycle line joined between a downstream side of said fuel cell stack and a middle point of said fuel line, wherein through said recycle line, reacted gas including residual non-reacted hydrogen exhausted from said fuel cell stack is mixed with the hydrogen supplied from the hydrogen cylinder, and said mixed hydrogen gas is supplied to said fuel cell stack.

16. A fuel cell control system for controlling a fuel cell stack constructed by a plurality of individual cells each of which generates an electric power by an electrochemical reaction of hydrogen and oxygen, said fuel cell control system comprising:

output voltage measuring means for measuring output voltages of all or a part of said individual cells; and diagnosing means for diagnosing said fuel cell stack on the basis of the measured output voltages and their statistics, and for diagnosing at least whether or not an amount of water involved in said fuel cell stack is excessive based on said output voltage and an average voltage of said output voltages; wherein:

said operation of said fuel cell control system is controlled according to said diagnosis result of said diagnosing means, when said diagnosis result of said diagnosing means indicates that said amount of water involved in said fuel cell stack is excessive, a supply pressure of said hydrogen as a fuel gas to be supplied to said fuel cell stack is relatively increased to a supply pressure of said oxygen as an oxidizing gas, and when said diagnosis result of said diagnosing means indicates that said amount of water involved in said fuel cell stack is insufficient, said supply pressure of said fuel gas to be supplied to said fuel cell stack is relatively decreased to said supply pressure of said oxidizing gas.

17. The fuel cell control system according to claim 16, further comprising a humidifier that humidifies said oxidizing gas to be supplied to said fuel cell stack, wherein when said diagnosis result of said diagnosing means indicates that said water involved in said fuel cell stack is excessive, said humidifier ceases to humidify said oxidizing gas, and when said diagnosis result of said diagnosing means indicates that said water involved in said fuel cell stack is insufficient, said humidifier increases an amount of humidification to said oxidizing gas.

18. A fuel cell control system for controlling a fuel cell stack constructed by a plurality of individual cells each of which generates an electric power by an electrochemical reaction of hydrogen and oxygen, said fuel cell control system comprising:

output voltage measuring means for measuring output voltages of all or a part of said individual cells; and diagnosing means for diagnosing said fuel cell stack on the basis of the measured output voltages and their statistics, and for diagnosing at least whether or not an amount of water involved in said fuel cell stack is excessive based on said output voltage and an average voltage of said output voltages; wherein:

said operation of said fuel cell control system is controlled according to said diagnosis result of said diagnosing means, said diagnosing means diagnoses whether or not a supply pressure of said hydrogen as a fuel gas to be supplied to said fuel cell stack is insufficient, when a diagnosis result of said diagnosing means indicates that said supply pressure of said fuel gas to be supplied to said fuel cell stack is insufficient, the fuel cell control system is controlled to increase said supply pressure of said fuel gas, when said diagnosis result of said diagnosing means indicates that said water involved in said fuel cell stack is excessive, a supply pressure of said hydrogen as a fuel gas to be supplied to said fuel cell stack is relatively increased to a supply pressure of said oxygen as an oxidizing gas to be supplied to said fuel cell stack, and when said diagnosis result of said diagnosing means indicates that said water involved in said fuel cell stack is insufficient, said supply pressure of said fuel gas to be supplied to said fuel cell stack is relatively decreased to said supply pressure of said oxidizing gas.

19. The fuel cell control system according to claim 18, further comprising a humidifier that humidifies said oxidizing gas to be supplied to said fuel cell stack, wherein when said diagnosis result of said diagnosing means indicates that said water involved in said fuel cell stack is excessive, said humidifier ceases to humidify said oxidizing gas, and when said diagnosis result of said diagnosing means indicates that said water involved in said fuel cell stack is insufficient, said humidifier increases an amount of humidification to said oxidizing gas.

* * * * *

UNITED STATES PATENT AND TRADEMARK OFFICE
CERTIFICATE OF CORRECTION

PATENT NO.         : 7,285,344 B2
APPLICATION NO. : 10/629586
DATED                 : October 23, 2007
INVENTOR(S)       : Tomonori Imamura et al.

It is certified that error appears in the above-identified patent and that said Letters Patent is hereby corrected as shown below:

On the Title page, please correct the second inventor's city of residence and the application number of the first priority document, as follows:

(75) Inventors:    Tomonori Imamura, Kariya (JP);
                           Akimasa Osaki, Susono (JP);
                           Toshiyuki Kawai, Toyohashi (JP);
                           Hideshi Izuhara, Nishikamo-gun (JP)

(30) Foreign Application Priority Data
  Jul. 30, 2002   (JP) ............................ 2002-221387
  Jun. 10, 2003   (JP) ............................ 2003-165387

Signed and Sealed this

Eighth Day of April, 2008

JON W. DUDAS
*Director of the United States Patent and Trademark Office*

UNITED STATES PATENT AND TRADEMARK OFFICE
CERTIFICATE OF CORRECTION

PATENT NO. : 7,285,344 B2
APPLICATION NO. : 10/629586
DATED : October 23, 2007
INVENTOR(S) : Tomonori Imamura et al.

It is certified that error appears in the above-identified patent and that said Letters Patent is hereby corrected as shown below:

On the Title page, please correct the second inventor's city of residence and the application number of the first priority document, as follows:

(75) Inventors: Tomonori Imamura, Kariya (JP);
Akimasa Osaki, Susono (JP);
Toshiyuki Kawai, Toyohashi (JP);
Hideshi Izuhara, Nishikamo-gun (JP)

(30) Foreign Application Priority Data
Jul. 30, 2002 (JP) ............................ 2002-221387
Jun. 10, 2003 (JP) ............................ 2003-165381

This certificate supersedes the Certificate of Correction issued April 8, 2008.

Signed and Sealed this

Twenty-third Day of September, 2008

JON W. DUDAS
*Director of the United States Patent and Trademark Office*

UNITED STATES PATENT AND TRADEMARK OFFICE
CERTIFICATE OF CORRECTION

PATENT NO.       : 7,285,344 B2  Page 1 of 1
APPLICATION NO. : 10/629586
DATED            : October 23, 2007
INVENTOR(S)      : Tomonori Imamura et al.

It is certified that error appears in the above-identified patent and that said Letters Patent is hereby corrected as shown below:

On the Title page, please correct the second inventor's city of residence and the application number of the second priority document, as follows:

(75) Inventors:     Tomonori Imamura, Kariya (JP);
                    Akimasa Osaki, Susono (JP);
                    Toshiyuki Kawai, Toyohashi (JP);
                    Hideshi Izuhara, Nishikamo-gun (JP)

(30) Foreign Application Priority Data
        Jul. 30, 2002   (JP) ............................ 2002-221387
        Jun. 10, 2003   (JP) ............................ 2003-165381

This certificate supersedes the Certificates of Correction issued April 8, 2008 and September 23, 2008.

Signed and Sealed this

Eleventh Day of November, 2008

JON W. DUDAS
*Director of the United States Patent and Trademark Office*